April 10, 1951     C. L. BROUGHTON     2,548,000
MUSICAL CHORD INDICATING MACHINE
Filed March 10, 1950     3 Sheets-Sheet 1
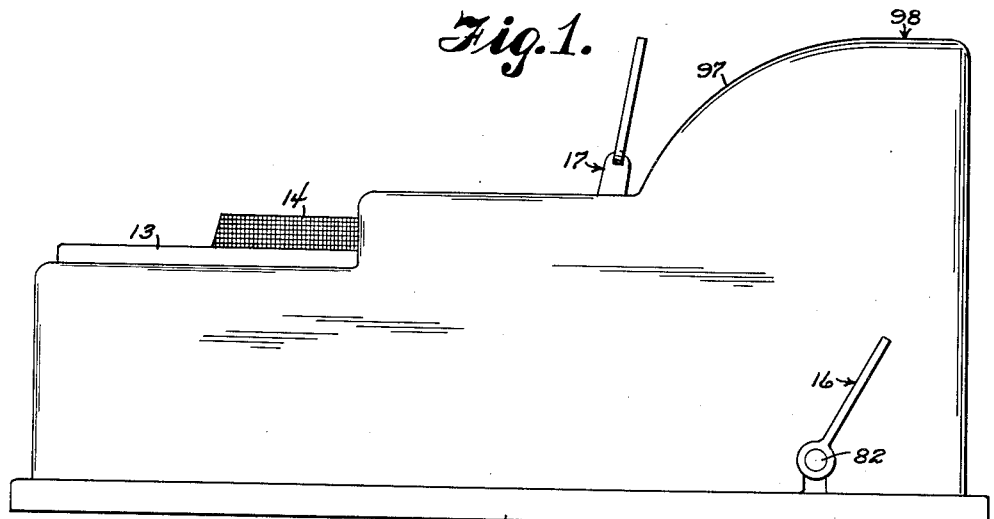
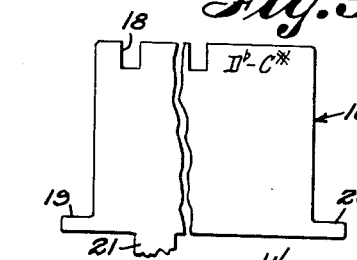
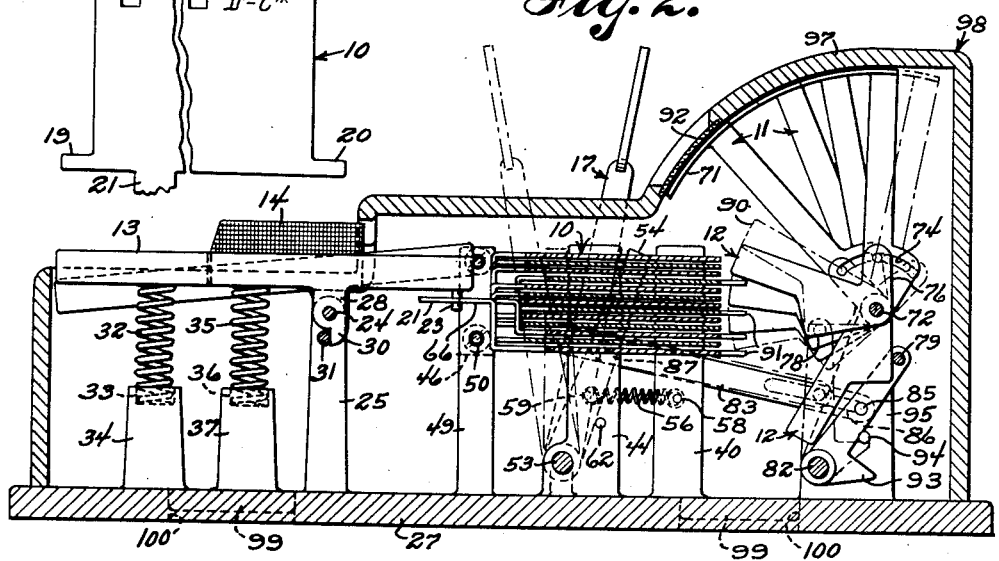
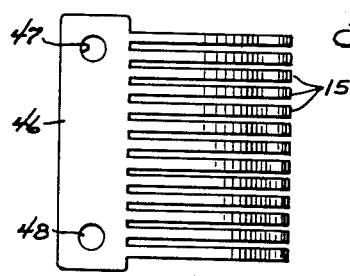
INVENTOR.
Cyril L. Broughton
BY Victor J. Evans & Co.
ATTORNEYS April 10, 1951  C. L. BROUGHTON  2,548,000
MUSICAL CHORD INDICATING MACHINE
Filed March 10, 1950  3 Sheets-Sheet 2

INVENTOR.
Cyril L. Broughton
BY Victor J. Evans & Co.
ATTORNEYS

April 10, 1951  C. L. BROUGHTON  2,548,000
MUSICAL CHORD INDICATING MACHINE
Filed March 10, 1950  3 Sheets-Sheet 3
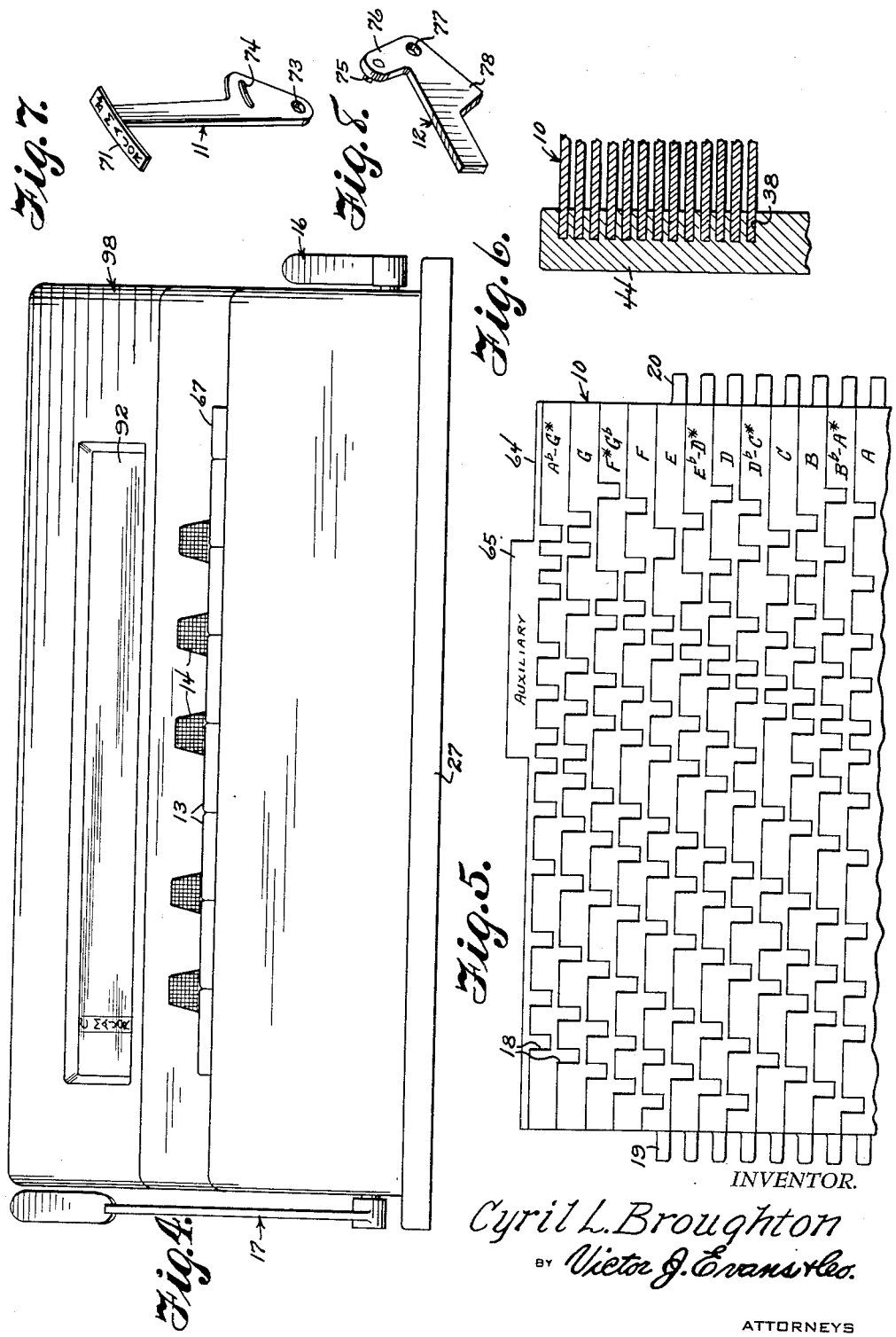
INVENTOR.
Cyril L. Broughton
BY Victor J. Evans & Co.
ATTORNEYS Patented Apr. 10, 1951

2,548,000

UNITED STATES PATENT OFFICE 2,548,000

MUSICAL CHORD INDICATING MACHINE

Cyril L. Broughton, Washington, D. C.

Application March 10, 1950, Serial No. 148,760

6 Claims. (Cl. 84—477)

This invention relates to musical accessories in combination with the piano, accordion, guitar, or other musical instruments and in particular a mechanically actuated musical device whereby a musician, student or other interested person may ascertain the proper chord name for a group or groups of notes by pressing keys or buttons representing the notes.

The purpose of this invention is to provide a mechanical device whereby by pressing keys or buttons of certain notes or groups of notes instrumentalities are set up so that by actuating a lever the name of a chord represented by the note or groups of notes shows through an opening or window of the indicator.

Certain instruments, such as the accordion and guitar, require the names of the chord rather than each individual note comprising the chord for the most practical and easy rendering of the harmony or accompaniment.

The bass buttons on an accordion, for instance, play a complete chord consisting of three or more notes by pressing a single button. Therefore, the name of the chords, rather than the individual notes comprising the chords is necessary.

In like instance, the guitar player depends on positions of his or her fingers to produce the entire chord, and can readily obtain these positions by knowing the chord names rather than having to obtain them from each individual note comprising the chord.

Accordion and guitar music generally is written or printed with the names of the complete chords used in the harmony or accompaniment. If players on these instruments wished to play from music not having these chord names, but having only the notes comprising the chords, such as most piano music, they would be required to have the necessary knowledge of music or harmony or other means in order to obtain the necessary and correct chord names from the given groups of notes.

Other instruments besides the accordion and guitar also require this information.

Extensive knowledge of harmony is required to determine the proper chord name for a group or groups of notes and various devices such as lengthy charts have been provided for assisting musicians, students and the like to determine the proper chord name.

It is difficult for a student or even a musician with an extensive knowledge of harmony to instantly determine the proper chord name for a group or groups of notes and even then it is possible to make a mistake. With this thought in mind this invention contemplates mechanical means whereby when certain keys or buttons are actuated the proper chord name is set up.

The object of this invention is, therefore, to provide means for mechanically determining the proper chord name for a group or groups of notes so that a musician, student or the like may have the assurance of knowing the correct chord to be played on their respective instrument.

Another object of the invention is to provide a musical chord name indicator in which elements may be combined for indicating the names of a comparatively few chords or may be extended to include a comparatively large number of chords.

A further object of the invention is to provide a mechanical musical chord name indicator which is of a comparatively simple and economical construction.

With these and other objects and advantages in view the invention embodies a musical chord name indicator having a plurality of sliding plates with spaced notches in the edges, a plurality of chord name levers positioned to drop through registering notches of selector plates, means for suspending and releasing the levers, resilient means for urging the plates into the path of the levers, means for releasing selected plates by pressing levers, buttons, or the like, and means for returning the plates after the proper chord name is indicated.

Other features and advantages of the invention will appear from the following description taken in connection with the drawings, wherein:

Figure 1 is a side elevational view of the machine.

Figure 2 is a typical cross section through the machine.

Figure 4 is a view showing a front elevation of the machine.

Figure 5 is a plan view illustrating a plurality of selector plates with the plates slid progressively outwardly.

Figure 6 is a cross section taken on line 6—6 of Figure 3 illustrating grooves in the inner surfaces of posts positioned in the case in which the selector plates are slidably mounted.

Figure 7 is a detail illustrating one of the chord name levers.

Figure 8 is a detail illustrating one of the lever actuating arms.

Figure 9 is a detail on an enlarged scale illustrating one of the selector plates with the intermediate portion thereof broken away.

Figure 10 is a detail illustrating the plate actuating spring fingers which slide the plates into the path of the lever actuating arms when the plates are released.

Figure 3:
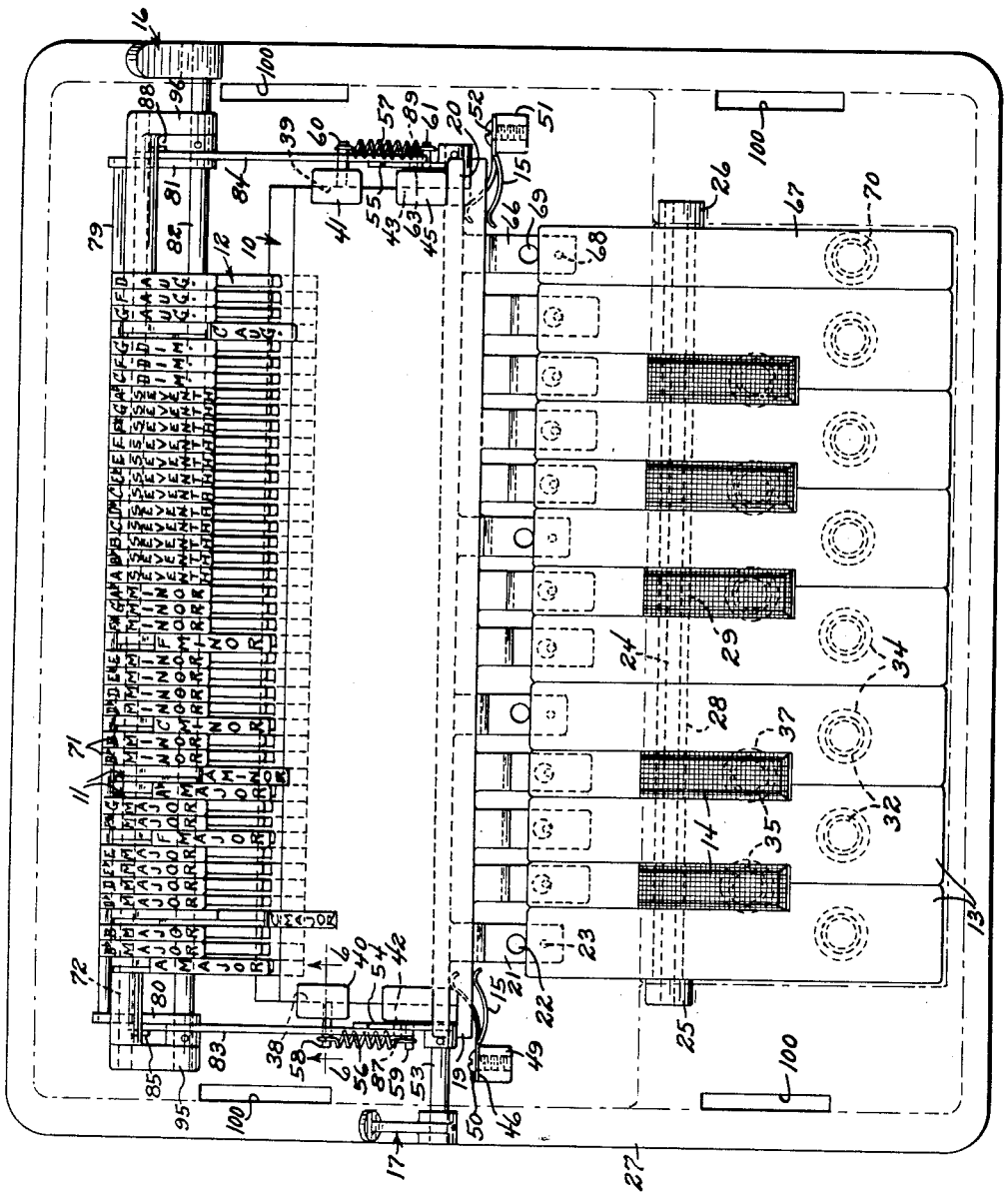
Figure 3 is a plan view of the machine with the cover removed.

Referring now to the drawings wherein like reference characters denote corresponding parts the proper musical chord name indicator of this invention includes a plurality of selector plates 10, chord name levers 11, lever actuator arms 12, keys 13 and 14, spring fingers 15, a release lever 16 and a return lever 17.

The selector plates 10 are formed as illustrated in Figures 5 and 9 with a plurality of spaced notches 18 in their inner edges and with shoulders 19 and 20 extended from the ends of the opposite side. Each of the levers is provided with a tongue 21 having an opening 22 therein and the opening is positioned to receive a pin 23 extended downwardly from the inner end of the corresponding key, 13 or 14.

The keys 13 and 14 are pivotally mounted on a shaft 24 that is mounted in posts 25 and 26 extending upwardly from a base 27 and the shaft extends through lugs 28 and 29 on the under surfaces of the keys 13 and 14 respectively. The lugs are provided with fingers 30 that engage a stop bar 31, as illustrated in Figure 2. The keys 13 are resiliently urged upwardly by springs 32 that are mounted in recesses 33 in posts 34 and the keys 14 are held by similar springs 35 in recesses 36 in posts 37.

The tongues 21 on the outer edges of the selector plates are formed as illustrated in Figures 2 and 3 and some of the tongues extend downwardly and outwardly and some extend upwardly and outwardly whereby sections of the tongues in which the openings 22 are positioned are in a common plane.

The selector plates 10 are slidably mounted in grooves 38 and 39 in inner posts 40 and 41 respectively, and grooves 42 and 43 in outer posts 44 and 45 respectively.

The spring fingers 15 are carried by plates 46 having openings 47 and 48 in the ends and the plate 46, at one end is mounted on a post 49 by screws 50 with the plate at the opposite side of the machine mounted on a post 51 by screws 52.

The return lever 17 is mounted on a shaft 53, and arms 54 and 55 extend upwardly from the shaft along the ends of the selector plates and as the lever 17 is drawn outwardly the levers 54 and 55 engage the shoulders 19 and 20 sliding the selector plates outwardly so that the pins 23 drop into the openings 22 in the tongues thereof. The shaft 53 is journaled in the posts 44 and 45 and the lever is held by springs 56 and 57, the spring 56 being attached to the post 40 by a pin 58 at one end, and attached to the lever 17 by a pin 59, at the other. The spring 57 is similarly connected to a pin 60 on the post 41 and to a pin 61 on the lever 55. Stop pins 62 and 63 are positioned to engage the levers 54 and 55 to limit the movement of the lever 17.

An auxiliary selector plate 64 is provided and by the use of this plate chords requiring four notes are covered up leaving three note chords available. In case of a three note chord the lever 67 must also be depressed releasing a fourth plate 64 carrying a tongue 65 which prevents the key levers of a four note chord from indicating another chord, and this plate is provided with a tongue 66 similar to the key 13. The key 67 is provided with a pin 68 that extends into an opening 69 in the tongue 66 and a spring 70 is provided for returning the key which is pivotally mounted on the shaft 24.

The chord name levers 11 are formed as illustrated in Figure 7 wherein name plates or chord name indicators 71 are carried by the outer ends. The inner ends of the levers 11 are pivotally mounted on a shaft 72 which extends through openings 73 in the levers and the levers are also provided with elongated arcuate slots 74 into which pins 75 on extensions 76 of the actuator arms 12 extend. The arms 12 are also pivotally mounted on the shaft 72 through openings 77 in the inner ends thereof.

The actuator arms 12 are also provided with shoulders 78 that rest upon a bar 79 mounted in the upper ends of arms 80 and 81 on a shaft 82 and the arms 80 and 81 are connected to the levers 54 and 55, respectively by links 83 and 84. The link 83 is pivotally connected to the arm 80 by a pin 85 that extends into an elongated slot 86 in the link and the opposite end is pivotally connected to the lever 54 by a pin 87. The link 84 is similarly connected with one end connected to the arm 81 by a pin 88, through a slotted hole in the link, and the other connected to the lever 55 by a pin 89.

After the machine has been used to indicate the proper name of a chord the lever 17 is moved from the position shown in full lines in Figure 2 to the position shown in dotted lines to return the selector plates to the normal position and in this movement the links 83 and 84, through the arms 80 and 81 draw the bar 79 under the shoulders 78 on the arms 12 whereby the ends of the arms are elevated to the dotted line position indicated by the numeral 90.

The shaft 82 is also provided with a release or thumb lever 16 by which, after certain of the selector plates have been released by the keys 13 and 14 whereby they extend inwardly, as indicated by the numeral 91 so that they are in the path of the arms 12, the rod 79 is moved from the position shown in dotted lines in figure 2 to that shown in full lines whereby the arms 12 drop downwardly by gravity upon the inner edges of the selector plates and the arm dropping through the number of slots indicating a chord, or the chord name corresponding with the notes represented by the keys pressed downwardly, is positioned to display the chord name through the continuous opening or elongated window 92.

The arms 80 and 81 are provided with shoulders, as indicated by the numeral 93 and these shoulders engage pin 94 on posts 95 and 96 in which the shafts 72 and 82 are journaled.

The window 92 is provided in an arcuate hood 97 of a cover 98 that is provided with tongues 99 that extend downwardly into recesses 100 in the base 27.

With the parts arranged in this manner keys or buttons corresponding to a certain group of notes such as C E G and B flat are pressed downwardly whereby the pins 23 of these keys move upwardly out of the openings 22 so that the spring 15 fingers the plates inwardly. The thumb lever 16 is then pressed over so that the bar 79 releases the arms 12 and the chord name levers 11 and where the notches in the plate register the arms drop through, but as this group of notes has only one chord name, only one of the arms drop through the plates to the point where the name plate 71 shows through the window 92. By this means the proper chord name for the notes represented by the keys or buttons actuated shows through a window whereby the name of the chord is accurately determined by mechanical means.

The machine may be provided with only the number of plates required to indicate the basic or fundamental chords or as many plates and corresponding keys or buttons may be provided as may be desired.

It will be understood that modifications may be made in the design and arrangement of the parts without departing from the spirit of the invention.

What is claimed is:

1. A musical chord name indicator comprising a group of selector plates having notches in the edges with the notches of the plates positioned to register, a plurality of chord name indicating levers, means positioning the selector plates to to limit movement of the chord name indicating levers, means retaining the said chord name indicating levers in non-indicating positions, means releasing the chord name indicating levers, and means coacting with the chord name indicating levers and notches of the plates whereby the chord name indicating levers indicate the chord name corresponding with the selector plates actuated.

2. A musical chord name indicator comprising a group of selector plates having notches in the edges with the notches of the plates positioned to register, a plurality of chord name indicating levers, means positioning the selector plates to limit movement of the chord name indicating levers, means retaining the said chord name indicating levers in non-indicating positions, means releasing the chord name indicating levers, means coacting with the chord name indicating levers and notches of the plates whereby the chord name indicating levers indicate the chord name corresponding with the selector plates actuated, and means for returning the said chord name levers and selector plates to inoperative positions.

3. In a musical chord name indicator, the combination which comprises a plurality of selector plates having notches in one of the sides, tongues extended from the opposite sides and shoulders extended from the ends, a case, means slidably mounting the selector plates in the case, keys pivotally mounted in the case, means whereby the selector plates are actuated by the keys, chord name indicating levers pivotally mounted in the case, said case having a window therein, means retaining the chord name indicating levers in inoperative positions, and means releasing the said chord name indicating levers whereby the levers are actuated by gravity to coact with the notches in the selector plates to indicate the chord name corresponding with the selector plates actuated by the keys through the window of the case.

4. In a musical chord name indicator, the combination which comprises a plurality of selector plates having notches in one of the sides, tongues extended from the opposite sides and shoulders extended from the ends, a case, means slidably mounting the selector plates in the case, keys pivotally mounted in the case, means whereby the selector plates are actuated by the keys, chord name indicating levers pivotally mounted in the case, said case having a window therein, means retaining the chord name indicating levers in inoperative positions, means releasing the said chord name indicating levers whereby the levers are actuated by gravity to coact with the notches in the selector plates to indicate the chord name corresponding with the selector plates actuated by the keys through the window of the case, and means returning the chord name lever and selector plates to the inoperative positions.

5. In a musical chord name indicator, the combination which comprises a plurality of selector plates having notches in one of the sides, tongues extended from the opposite sides and shoulders extended from the ends, a case, means slidably mounting the selector plates in the case, keys pivotally mounted in the case, means whereby the selector plates are actuated by the keys, chord name indicating levers pivotally mounted in the case, lever actuator arms pivotally mounted in the case and positioned to pass through the notches of the selector plates, means operatively connecting the said lever actuator arms to the chord name levers, said case having a window therein, means retaining the chord name indicating levers in inoperative positions, means releasing the said chord name indicating levers whereby the levers are actuated by gravity to coact with the notches in the selector plates to indicate the chord name corresponding with the selector plates actuated by the keys through the window of the case, and means returning the chord name lever and selector plates to the inoperative positions.

6. In a musical chord name indicating device, the combination which comprises a group of selector plates having notches in edges thereof with the plates positioned whereby some of the notches of one plate register with some of the notches of other plates, a plurality of chord name indicators mounted to coact with the notches of the said selector plates, and positioned by the selector plates whereby the said plates coact with the said chord name indicators so that the chord name indicators are moved to indicating positions for indicating names of chords corresponding to the selector plates actuated.

CYRIL L. BROUGHTON.

REFERENCES CITED

The following references are of record in the file of this patent:

UNITED STATES PATENTS

| Number | Name | Date |
| --- | --- | --- |
| 1,840,903 | Hurst | Jan. 12, 1932 |